UNITED STATES PATENT OFFICE.

CARL HARRIES, OF KIEL, GERMANY, ASSIGNOR TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,073,116.   Specification of Letters Patent.   Patented Sept. 16, 1913.

No Drawing.   Application filed February 24, 1913.   Serial No. 750,235.

*To all whom it may concern:*

Be it known that I, CARL HARRIES, professor of chemistry, doctor of philosophy, citizen of the German Empire, residing at Kiel, Germany, have invented new and useful Improvements in Caoutchouc Substances and Processes of Making Same, of which the following is a specification.

I have made the surprising discovery that the alkali-forming metals, namely, the alkali and alkaline earth metals, both in an isolated state and in the form of their mixtures, alloys and amalgams, are capable of converting isoprene into a new caoutchouc substance.

This application is a division of my application Serial Number 658,536 filed November 4, 1911.

In order to illustrate the new process more fully the following example is given, the parts being by weight: 3 parts of sodium wire prepared in the usual way are pressed into 100 parts of isoprene having the formula:

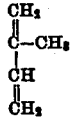

The autoclave is closed and it is heated to 36° C. during six weeks. The sodium is then destroyed by alcohol or water and the caoutchouc substance which has been formed is rolled into sheets. Instead of sodium, calcium, potassium, lithium or mixtures of these metals such as calcium-sodium and instead of sodium amalgam other amalgams such as ammonium amalgam, etc., may be used. These metals, whether used in an isolated condition alone or in the form of mixtures or alloys or amalgams, are all embraced within the generic term,—alkali-forming metals.

The new caoutchouc substance is a whitish substance soluble in benzene. It is free from protein substances which are always contained in the natural caoutchouc and play an important part in it with regard to the elasticity of the natural caoutchouc. It forms a mixture of a mono-ozonid and a diozonid being a thick oil, which detonates when heated, and brom addition products. It is in the vulcanized form a grayish, non adhesive substance, and the ozonids of which on decomposition with water do not show the pyrrol test or show it only very weakly.

I claim:—

1. The process of producing a caoutchouc substance which comprises subjecting isoprene to the action of an alkali-forming metal, substantially as described.

2. The process of producing a caoutchouc substance which comprises subjecting isoprene to the action of an alkali metal, substantially as described.

3. The process of producing a caoutchouc substance which comprises subjecting isoprene to the action of sodium, substantially as described.

4. New caoutchouc substance obtained by polymerization of isoprene which is characterized by being a whitish substance soluble in benzene, being free from protein substances and forming a mixture of a mono-ozonid and a diozonid being a thick oil, which detonates when heated, and brom addition products, and in the vulcanized form is a whitish substance which is not adhesive, and the ozonids of which on decomposition with water do not show the pyrrol test or show it only very weakly, substantially as described.

In testimony whereof I have hereunto set my hand in the presence of two subscribing witnesses.

CARL HARRIES.

Witnesses:
 FERDINAND ROHNOCOLSA,
 JOSEPH THÜMMEL.